Figure 1:
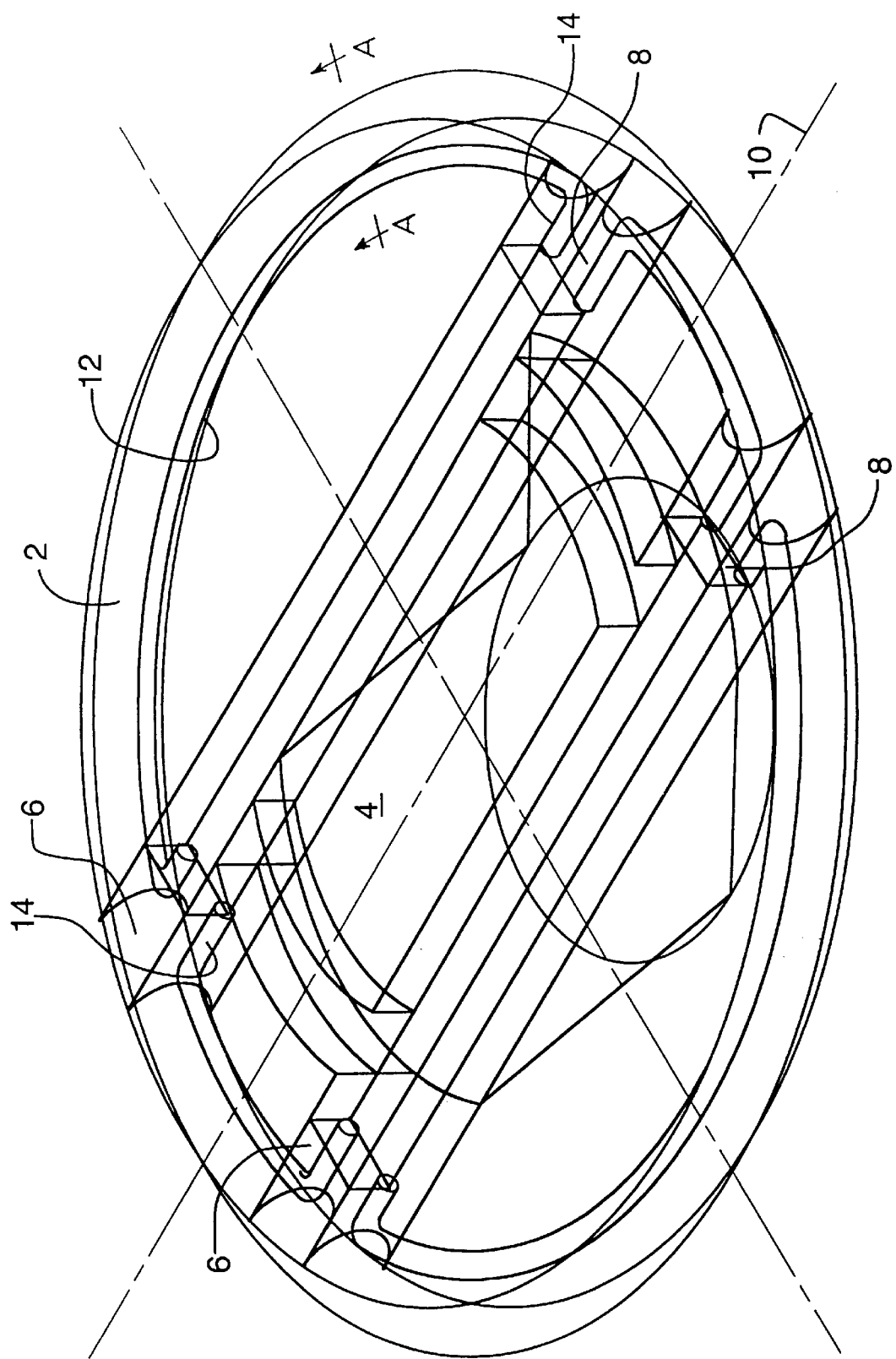

United States Patent [19]
Raetsen

[11] Patent Number: 6,079,292
[45] Date of Patent: Jun. 27, 2000

[54] METHOD AND APPARATUS FOR LEATHER WRAPPING OF A STEERING WHEEL

[75] Inventor: Henk Raetsen, Waterloo, Canada

[73] Assignee: Breed Automotive Technologies, Inc., Lakeland, Fla.

[21] Appl. No.: 09/126,862

[22] Filed: Jul. 31, 1998

Related U.S. Application Data

[62] Division of application No. 08/640,603, May 1, 1996, Pat. No. 5,802,718.

[51] Int. Cl.[7] ........................................... C21C 5/30
[52] U.S. Cl. .................................. 74/558; 74/552
[58] Field of Search ........................ 74/558, 552, 543

[56] References Cited

U.S. PATENT DOCUMENTS

| | | |
|---|---|---|
| 1,168,146 | 1/1916 | Barnes . |
| 2,227,579 | 1/1941 | Harley . |
| 3,222,952 | 12/1965 | Frye . |
| 3,576,139 | 4/1971 | Conterno . |
| 3,802,291 | 4/1974 | Young, Jr. et al. . |
| 4,535,221 | 8/1985 | Holsworth . |
| 4,581,954 | 4/1986 | Uchida ...................................... 74/552 |
| 4,824,873 | 4/1989 | Ushida et al. .......................... 521/137 |
| 4,920,822 | 5/1990 | Abiko . |
| 5,205,186 | 4/1993 | Draxlmaier .............................. 74/558 |
| 5,207,713 | 5/1993 | Park . |
| 5,224,397 | 7/1993 | Yoo . |

FOREIGN PATENT DOCUMENTS

| | | |
|---|---|---|
| 365176 | 4/1937 | Canada . |
| 801395 | 12/1968 | Canada . |
| 988396 | 4/1976 | Canada . |

*Primary Examiner*—Charles A. Marmor
*Assistant Examiner*—Tisha D. Waddell
*Attorney, Agent, or Firm*—Zarley, McKee, Thomte, Voorhees & Seas

[57] ABSTRACT

A method and apparatus for providing a leather wrapping on a steering wheel having a ring radially spaced and circumferentially extending about a central hub by providing a groove along the surface of the ring, preferably on the inwardly facing edge thereof, into which the edges of the leather wrapping may be inserted and secured and a bead which fits snugly within said groove to cover the groove and secure the edge of the leather therein.

6 Claims, 5 Drawing Sheets

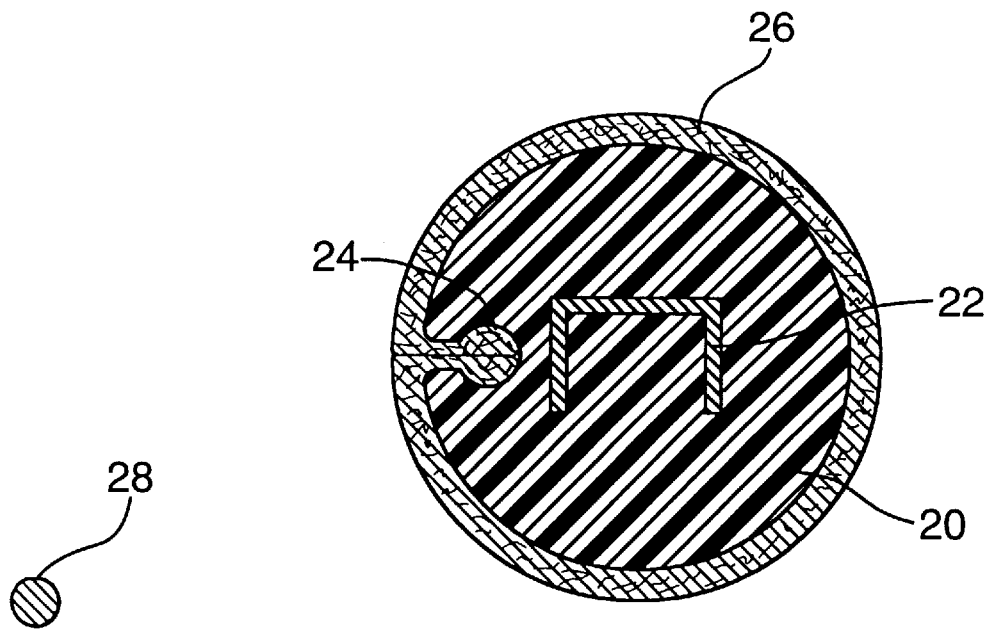
FIG.2A
FIG.2B
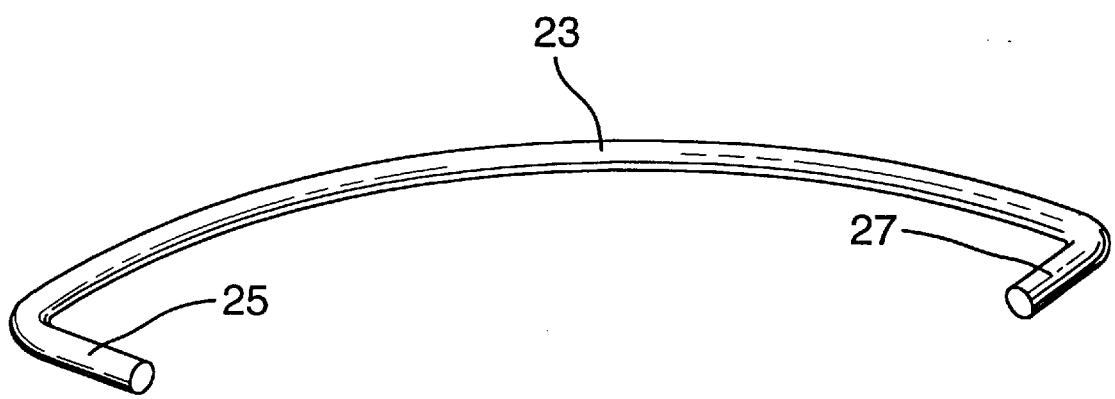
FIG.2C

METHOD AND APPARATUS FOR LEATHER WRAPPING OF A STEERING WHEEL

CROSS-REFERENCE TO A RELATED APPLICATION

This application is a divisional of commonly assigned application Ser. No. 08/640,603 filed May 1, 1996 now U.S. Pat. No. 5,802,718, the disclosure of which is hereby incorporated by reference.

This invention relates to an improved method and apparatus for applying a leather wrapping or cover to a steering wheel such as that of an automobile.

In particular, it relates to means for applying leather to an article such as a steering wheel without the laborious and expensive work of hand-stitching.

Steering wheels for automobiles which were initially made of wood, and later of moulded rigid plastic such as Bakelite or Nylon, have in recent years become more sophisticated. In particular, the stock or base material is often a PVC, TPR, DR or polyurethane which exhibit sufficient rigidity and yet has a somewhat pliable softness to the feel. Along with this development has come the pliable polymer material as an outer covering such as polyurethane film which may be formed as part of the stock material or as a separate cover.

While this material has somewhat the look and feel of leather, it is noticeably different, especially after aging, and the luxury of a hand made and traditional leather bound article is still desirable.

The difficulty in providing a leather wrapped steering wheel is that leather is not capable of being formed in place like a polyurethane film or layer, and therefore must be applied and fixed in place. In addition, unlike polymeric material, it cannot be fused or heat sealed in place and must therefore be applied in some traditional method which generally means stitching. Because of the complex configuration of a steering wheel, the stitching must be done on the article and this usually means that it must be done by hand and therefore is not amenable to automated process. Therefore, the cost of the labour involved is a distinct disadvantage which makes this luxury item unavailable except in expensive cars.

It is therefore the purpose of this invention to provide a method and apparatus whereby a steering wheel may be provided with a leather covering or wrapping without the labour intensive and expensive procedure of hand-stitching.

Various attempts have been made to provide a leather covering for a steering wheel in the past, such as a helical wrapping which progresses around the rim of the steering wheel, but this does not accommodate the rather complex shapes which are part of a modern steering wheel and in which electronic devices and air bags are incorporated.

It is therefore the purpose of this invention to provide means whereby a leather covering may be applied to steering wheels of various shapes with a degree of assembly line efficiency.

These objects and other advantages are sought to be achieved by means of the present invention in which a method of leather wrapping a steering wheel having a ring radially spaced and extending circumferentially about a central hub comprises providing a groove extending longitudinally and circumferentially on the surface of the steering wheel ring so that the edges of the leather wrapping can be inserted and fixed therein by means of welt which is adapted to fit snugly within the groove and secure the edges of the leather thereby.

Preferably the groove is located on the surface of the wheel faces radially inward.

In one embodiment the groove has a partially circular cross-section and the welt is a tubular or cylindrical bead which fits tightly therein.

In another embodiment the groove has flat parallel sides and the welt comprises a strip with a flange extending snugly within the groove. In another version the welt is a tubular or cylindrical bead with a flange extending into the groove and the bead may be leather wrapped as well.

Figure 3A:
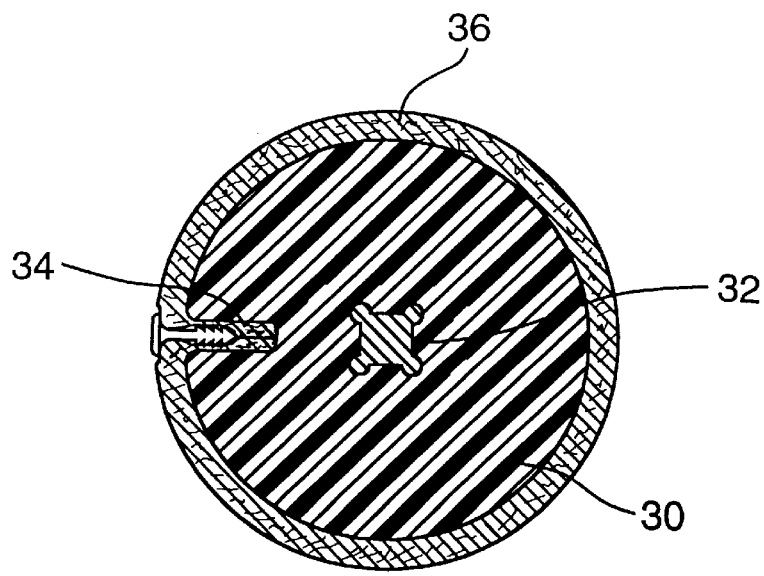
Figure 3B:
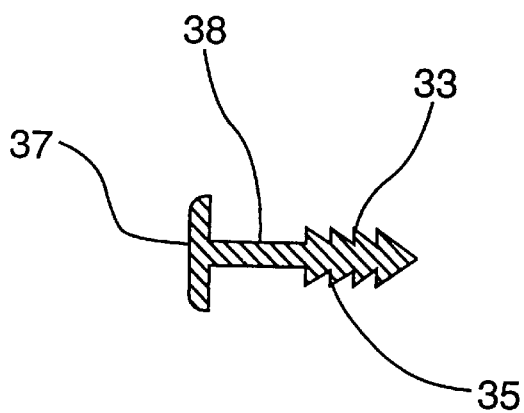
Figure 3C:
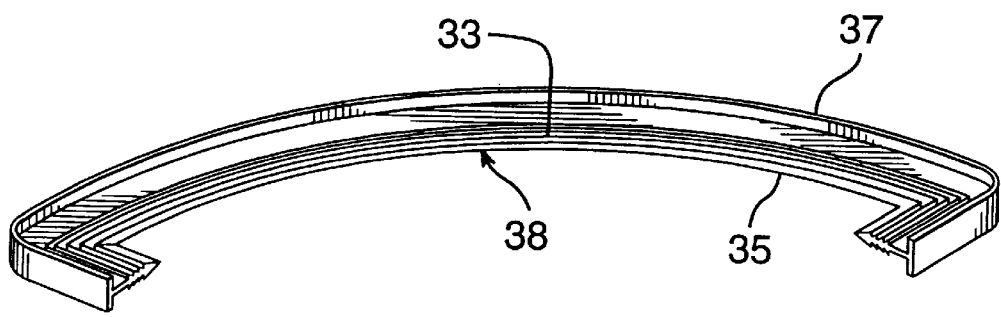
Figure 4A:
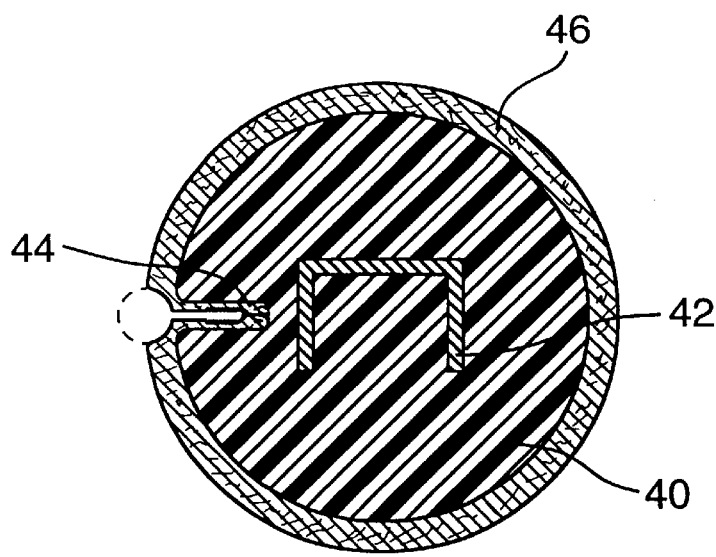
Figure 4B:
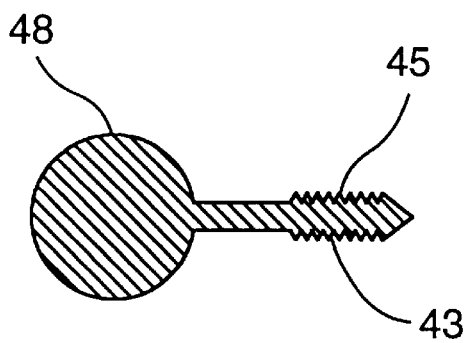
Figure 4C:
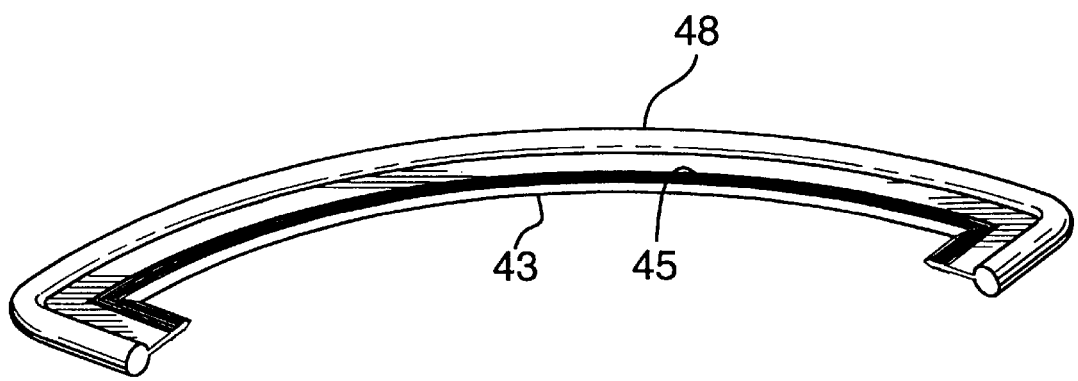
Figure 5A:
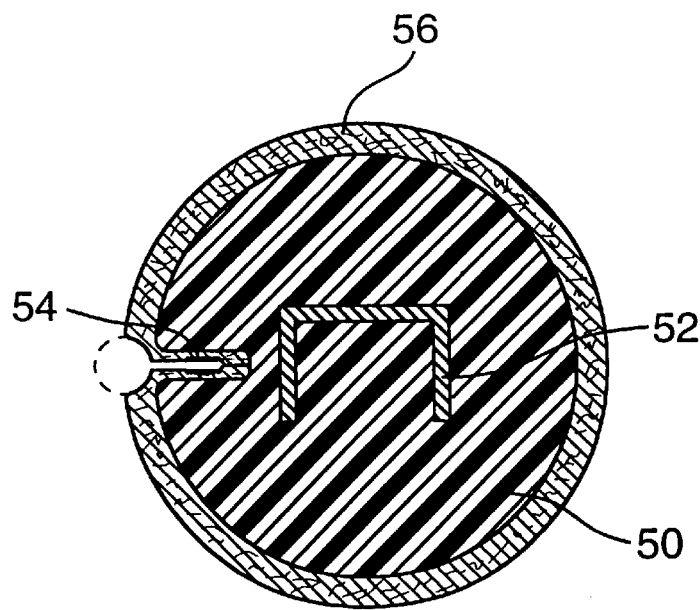
Figure 5B:
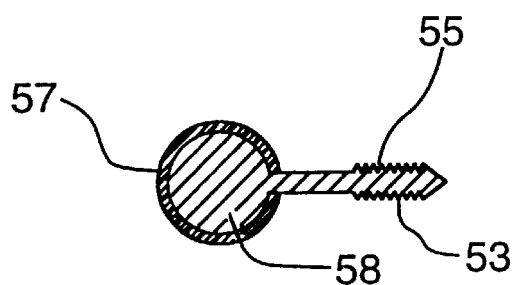
Figure 5C:
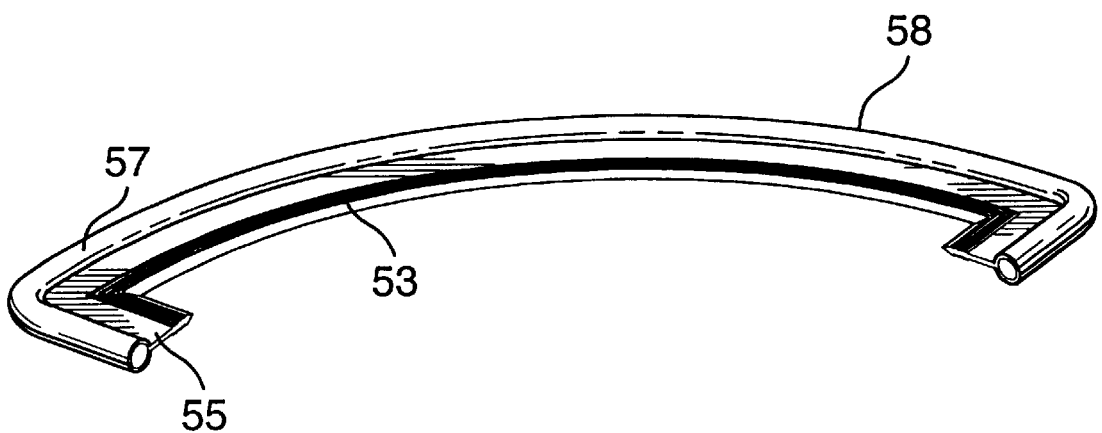

The present invention may be better understood by the following description of several embodiments thereof with reference to the attached drawings in which:

FIG. 1 is an isometric or perspective view of the shape of a mould for a steering wheel;

FIG. 2*a* represents a cross-section view of a leather wrapped steering wheel in the shape of a mould such as shown in FIG. 1;

FIG. 2*b* is a cross-section of the welt of the steering wheel in FIG. 2*a*;

FIG. 2*c* is a plan view of the welt illustrated in FIG. 2*b*;

FIG. 3*a* represents a cross-section view of a leather wrapped steering wheel in the shape of a mould such as shown in FIG. 1;

FIG. 3*b* is a cross-section of the welt of the steering wheel in FIG. 3*a*;

FIG. 3*c* is a plan view of the welt illustrated in FIG. 3*b*;

FIG. 4*a* represents a cross-section view of a leather wrapped steering wheel in the shape of a mould such as shown in FIG. 1;

FIG. 4*b* is a cross-section of the welt of the steering wheel in FIG. 4*a*;

FIG. 4*c* is a plan view of the welt illustrated in FIG. 4*b*;

FIG. 5*a* represents a cross-section view of a leather wrapped steering wheel in the shape of a mould such as shown in FIG. 1;

FIG. 5*b* is a cross-section of the welt of the steering wheel in FIG. 5*a*;

FIG. 5*c* is a plan view of the welt illustrated in FIG. 5*b*.

FIG. 1 of the illustrated embodiment shows, perspective view, the shape of the cavity of a mould in which a steering wheel for an automobile can be formed.

The cavity illustrated (and therefore the steering wheel which can be formed therein) comprises the ring 2 which is radially spaced and circumferentially extending and generally circular in its configuration about a central hub 4 where the stem of the steering column may be attached and an air bag may be enclosed.

The circular ring 2 has two pairs of projections 6 and 8 (although there may be more or less depending on the design) on respective sides of the steering wheel and spaced on either side of the lateral centre line 10. These projections extend over a portion of the outer radial ends of the spokes of the steering wheel which attach the ring to the hub and therefore the steering column, the details of which are unimportant to the present invention and vary from design to design.

Along the innermost surface of the mould ring 2 is a ridge 12 which projects towards the centre of the ring (radially outward from the centre of the wheel) and extends around the surface of the ring and along the sides of the projections 6 and 8 to the ends thereof as illustrated at 14.

By means of such a mould a steering wheel may be formed by injection moulding having a cross-section as illustrated in FIGS. 2*a*, 3*a*, 4*a* and 5*a*.

In FIG. 2a a cross-section of the ring 2 along the section line A—A is illustrated in which the injection moulded stock material 20 is formed in the mould of FIG. 1 around a reinforcing member 22 which provides rigidity and strength. The ridge 12 has formed a groove 24. The leather cover which is formed of a die cut piece of leather of appropriate shape, shown at 26, is wrapped around the ring and the edges tucked into the groove 24 where they are preferably secured by an adhesive which is previously placed in the groove.

To further secure the leather wrapping, a bead 28, shown in cross-section in FIG. 2b and in plan in FIG. 2c, is pressed into the groove to hold the lateral edges of the leather wrapping in place in the groove 24. The bead additionally provides a decorative cover for the groove and the edges of the leather.

Preferably, the groove is narrow at the throat and widens at the innermost part to hold the bead in place when it is positioned as illustrated in FIG. 2a.

As shown in FIG. 2c the bead may be preformed or may be sufficiently flexible to take the desired shape when installed and the curved portion 23 conforms to the inner surface of the ring of the steering wheel and the inward projections 25 and 27 conform to the grooves in the inward projections 6 and 8 as illustrated at 14 in FIG. 1. It will, of course, be realized that other portions of the steering wheel, such as the piece between the projections 6 or 8 will be of slightly different length and shape as required by the chosen design of the wheel.

In FIG. 3a a slightly different cross-section is illustrated in which the stock material of injection moulded plastic 30 is formed around the reinforcing insert 32 with a substantially rectangular groove 34 so that the edges of the leather wrapping can be inserted and glued.

In this embodiment a retaining strip or welt 38 is shown in cross-section in FIG. 3b and in plan view in FIG. 3c. In this embodiment the bead or welt 38 is not circular but has a T-shaped cross-section in which the flat strip 37 conforms to the outer surface of the steering wheel and the flange 35 extends radially into the groove and has a series of longitudinally extending radially spaced teeth 33 designed to hold the strip in the groove once it is installed.

FIG. 4a illustrates the cross-section of the ring of a steering wheel of a slightly different variation in which the injection moulded stock 40 is formed around a reinforcing member 42 and has an inward groove 44 with substantially rectangular sides so that the edges of the leather wrapping 46 may be inserted and glued therein.

In this embodiment the edge of the leather at the groove are additionally held in place by a bead 48 which is generally circular in cross-section as shown in FIG. 4b but has a flange running longitudinally along the surface and extending radially inwardly to extend into the groove 44 and additionally hold the leather edges in place by the tight fit assisted by the barbs or teeth 43. Thus, the circular bead of the welt 48 forms an additional decorative strip and covers the seam between the edges of the leather wrapping 46.

In FIG. 5a another embodiment of the ring of a steering wheel is shown in cross-section with the injection moulded material 50 formed around a reinforcing element 52 and having an inwardly extending groove 54 to receive the edges of the leather wrapping 56 similar to FIGS. 3a and 4a.

As in FIG. 4b, FIG. 5b shows a bead 58 designed with a circular cross-section and an inwardly projecting flange 55 with teeth 53 to engage the material at the sides of the groove 54 so as to hold the edges of the leather wrapping around the ring tightly in place and cover the seam. However, in this embodiment, the circular portion of the bead 58 is also covered by a leather wrapping 57 so that the bead as well as the ring is leather covered when the wheel is finished.

It will, of course, be realized that the plan view shown in FIGS. 2c, 3c, 4c and 5c represent only a portion of the bead or welt inserted in the groove around the inner periphery of the ring and the inward projections 6 and 8 illustrated in FIG. 1. An additional similar bead or welt is required on the other side of the wheel and two shorter pieces in the grooves which extend along and between the projection 6 and the projection 8 respectively.

By forming a steering wheel using the mould configuration illustrated in FIG. 1, and covering the wheel with a piece of leather cut to appropriate shape, and tucking the edges into the grooves illustrated, an attractive looking steering wheel with the appropriate feel is provided without the labour and expense of hand-stitching.

In addition, by installing the beads or welts shown in the illustrative embodiments, the leather wrapping may be not only additionally secured in the groove but can provide an attractive and effective means of finishing the wrapping process.

It will, of course, be realized that numerous modifications and variations of the illustrated embodiments may be employed without departing from the inventive concept herein.

What is claimed is:

1. Apparatus for leather wrapping of a steering wheel having a ring spaced radially and extending circumferentially about a central hub and attached thereto by spokes, said apparatus comprising:

a groove extending circumferentially along the surface of said ring and adapted to receive the edges of the leather therein;

a strip of welting, a portion of which is adapted to fit snugly in said groove and secure said leather wrapping thereby;

said groove being substantially circular in cross-section with an inlet leading thereto and said welt has a substantially circular cross-section.

2. Apparatus as claimed in claim 1 in which said groove has substantially flat parallel sides and said welt comprises a bead of circular cross-section having a flange extending laterally therefrom and adapted to be snugly engaged in said groove.

3. Apparatus for leather wrapping of a steering wheel having a ring spaced radially and extending circumferentially about a central hub and attached thereto by spokes, said apparatus comprising:

a groove extending circumferentially along the surface of said ring and adapted to receive the edges of the leather therein;

a strip of welting, a portion of which is adapted to fit snugly in said groove and secure said leather wrapping thereby;

said groove being aligned with the intersection of said spokes with said ring and extending along at least a portion of said spokes, and said welting being adapted to fit snugly in said groove in said ring and said groove in said spokes;

said groove being substantially circular in cross-section with an inlet leading thereto and said welt has a substantially circular cross-section.

4. Apparatus for leather wrapping of a steering wheel having a ring spaced radially and extending circumferentially about a central hub and attached thereto by spokes, said apparatus comprising:

a groove extending circumferentially along the surface of said ring and adapted to receive the edges of the leather therein;

a strip of welting, a portion of which is adapted to fit snugly in said groove and secure said leather wrapping thereby;

said groove being aligned with the intersection of said spokes with said ring and extending along at least a portion of said spokes, and said welting being adapted to fit snugly in said groove in said ring and said groove in said spokes;

said groove having substantially flat parallel sides and said welt comprising a bead of circular cross-section having a flange extending laterally therefrom and adapted to be snugly engaged in said groove.

5. Apparatus as claimed in claim 2 in which said circular bead is wrapped with leather.

6. Apparatus as claimed in claim 4 in which said circular bead is wrapped in leather.

* * * * *